Jan. 24, 1967     J. M. BEDDOES     3,300,689
VOLTAGE SENSING CIRCUIT
Filed Nov. 21, 1963
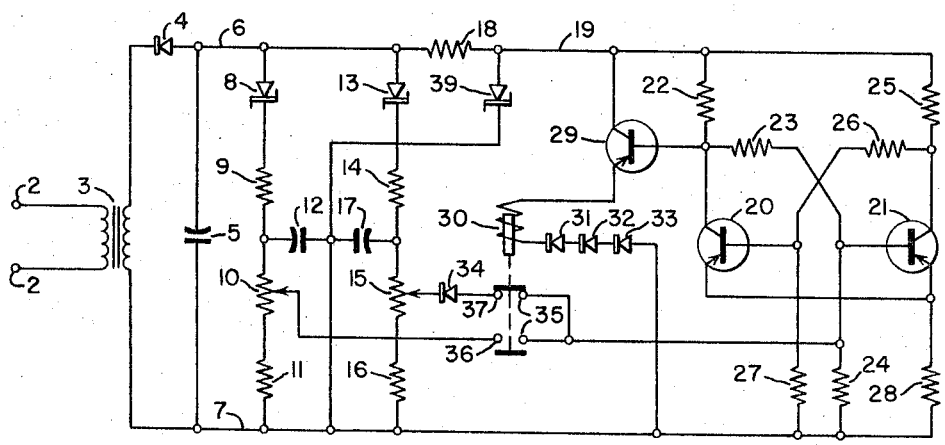
WITNESSES:
Bernard R. Gagnay
James F. Young
INVENTOR
John M. Beddoes
BY
Clement L. McHale
ATTORNEY United States Patent Office 3,300,689
Patented Jan. 24, 1967

3,300,689
VOLTAGE SENSING CIRCUIT
John M. Beddoes, Ottawa, Ontario, Canada, assignor to Canadian Westinghouse Company, Limited, Hamilton, Ontario, Canada
Filed Nov. 21, 1963, Ser. No. 325,317
Claims priority, application Canada, Dec. 21, 1962, 865,116
5 Claims. (Cl. 317—148.5)

This invention relates to a voltage sensing relay or circuit and in particular to a voltage sensing relay or circuit capable of changing its condition in response to precisely selected limits of the input signal.

Under certain circumstances it is desirable to sense the potential of a source and cause certain functions to be performed in response to variations in this potential. It may be desired in particular to cause a relay to drop out when a source potential falls below a certain value. It may also be desirable to cause the relay to pick up when the source potential once more rises to a predetermined value. These two predetermined values however while they may be precisely selected may not be the same value. This is particularly true in cases where it is desired to transfer a load from one source to another upon failure of the first source and then cause the load to be transferred back to the original source when the original source once more assumes its nominal value.

Relays have been designed in the past to perform this function. It is well known for example that a relay picks up at a particular voltage and drops out at some lower voltage. By design of the relay it is possible to determine approximately the voltages at which it picks up and drops out. It is however very difficult to design a relay which will perform this function accurately and it is further difficult to design a relay which is adjustable with respect to its pick-up and drop-out points. Relays also have a tendency to become unstable and chatter when they approach their operative point.

It is therefore an object of this invention to provide a voltage sensing relay with adjustable pick-up and drop-out points.

It is a further object of this invention to provide a voltage sensing relay which will rapidly and positively switch from one condition to the other at predetermined voltage levels with a minimum tendency to instability.

It is a further object of this invention to provide a voltage sensing relay which does not require a further source of potential other than the source being sensed to permit reliable operation.

These and other objects are attained by controlling the relay from a bistable electronic circuit. The bistable electronic circuit is triggered from one condition to the other condition in response to a voltage derived from the source which is to be sensed. This voltage is derived from either of two adjustable potentiometers one of which is utilized when the bistable circuit is in one condition and the other which is utilized when the bistable circuit is in the other condition. The adjustment of these two potentiometers therefore will determine the pick-up and drop-out potential of the relay. The bistable electronic circuit inherently has no unstable condition. Once it is triggered from one condition it invariably switches to the other condition and remains there until triggered back to the original condition. The completion of the switching action does not depend upon the maintenance of any control signal and the circuit is therefore inherently stable in both of its conditions.

A clearer understanding of my invention may be had from a consideration of the following specification and drawing, in which the single figure is a schematic diagram of a circuit in accordance with my invention.

Considering the figure there is shown a source of alternating current which is to be sensed. The source may for example be nominally 120 volts 60 cycles and is applied to terminals 2 of transformer 3.

The output from the secondary of transformer 3 is a substantially lower voltage which may for example be in the neighborhood of 13 volts. This alternating potential is applied to diode 4 and reservoir capacitor 5, to produce a D.C. output across conductors 6 and 7 with conductor 6 negative.

Across these two conductors are connected a pair of potentiometer chains; the first comprising Zener diode 8, resistor 9, potentiometer 10, and resistor 11, with condenser 12 connected from the junction of resistor 9 and potentiometer 10 to conductor 7. The second potentiometer chain comprises Zener diode 13, resistor 14, potentiometer 15 and resistor 16, and condenser 17 connected from the junction of resistor 14 and potentiometer 15 to conductor 7. Resistor 18 and Zener diode 39 together reduce and stabilize the voltage appearing across conductors 7 and 19 to a value less than that appearing across conductors 6 and 7. Preferably the voltages across conductors 19 and 7 is sixty percent of the voltage which would appear across 6 and 7 with the input at its nominal value.

A pair of transistors 20 and 21 are connected in an emitter coupled bistable circuit as follows:

Potentiometer network comprising resistors 22, 23 and 24 is coupled between conductor 19 and conductor 7. The junction of resistors 22 and 23 is coupled to the collector of transistor 20. The junction of resistors 23 and 24 is connected to the base of transistor 21. A similar network comprising resistors 25, 26 and 27 is also connected between conductors 19 and 7 and the junction of resistors 25 and 26 is connected to the collector of transistor 21, while the junction of resistors 26 and 27 is connected to the base of transistor 20. The emitters of both transistors 20 and 21 are joined together and returned to conductor 7 through resistor 28.

A further transistor 29 of the switching type is controlled by the condition of the bistable circuit, its base being connected to the collector of transistor 20. The collector of transistor 29 is connected to conductor 19 while the emitter is connected through a relay coil 30 and diodes 31, 32 and 33 to conductor 7. The base of transistor 21 is connected through relay contacts either directly to the slider of potentiometer 10 or through diode 34 to the slider of potentiometer 15. When coil 30 is energized, relay contacts 35 and 36 are connected and when the relay coil 30 is not energized, relay contacts 35 and 37 are interconnected.

*Operation of the circuit*

Let us assume that a 60 cycle nominally 120 volt input is applied to terminals 2 and the ratio of transformer 3 is such as to produce approximately 13 volts alternating current in the secondary of transformer 3, under these circumstances. With diode 4 as shown, this diode together with condenser 5 will produce a pulsating D.C. voltage across conductors 6 and 7 of approximately 13½ volts, depending upon the load applied to the conductors by the remainder of the circuit. This pulsating D.C. voltage is applied to the potentiometer networks.

Considering the first network comprising Zener diode 8, resistor 9, potentiometer 10 and resistor 11, it will be seen that irrespective of the voltage across conductors 6 and 7, a certain specified voltage will appear across Zener diode 8. The remainder of the voltage between conductors 6 and 7 will appear across resistor 9, potentiometer 10, and resistor 11. Due to the pulsating nature of the potential across conductors 6 and 7, the voltage at the slider of potentiometer 10 would include a large A.C. component. In order to eliminate this component as much as possible, the condenser 12 is connected between ground and the junction of resistor 9 and potentiometer 10. The selection of the value of this condenser will depend upon the amount of ripple present and the degree to which it is desired to suppress this ripple, at the same time recognizing that the presence of condenser 12 produces a time delay in voltage changes at the slider of potentiometer 10. The relay 30 however will normally produce a substantial time delay and as long as the time factor introduced by this condenser 12 is substantially less than the time factor produced by the relay 30 itself, it will not produce an undesirable time delay in the operation of the circuit. The Zener diode 8 is selected so that its voltage drop is approximately 6¼ volts. This means that the voltage across the remainder of potentiometer is normally about 7¼ volts as long as the input maintains its value at 120 volts.

The operation of the second potentiometer network is identical with that of the first except the Zener diode 13 has a much less voltage drop and is selected at about 4 volts. The voltage drop across the remainder of the potentiometer network comprising resistors 14, potentiometer 15 and resistor 16 will therefore be about 9½ volts.

Zener diode 39 is connected across conductors 6 and 7 through resistor 18. Zener diode 39 is selected to have a voltage drop across it of approximately 60 percent of the normal voltage appearing across conductors 6 and 7. For example the potential appearing across conductors 19 and 7 will be about 8 volts. Due to the operation of the Zener diode this value will be constant irrespective of the voltage across conductors 6 and 7 as long as this potential does not fall below 8 volts. As is well known this Zener diode has a low A.C. resistance and therefore the potential appearing across conductors 19 and 7 is a relatively constant D.C. voltage with a minimum amount of ripple. Resistor 18 of course must be chosen to limit the current through the Zener diode and produce the desired voltage reduction between conductors 6 and 19 without excessive current.

Considering now transistors 20 and 21 and assuming the circuit has just been switched on it will be assumed that the resistance of resistor 22 equals that of resistor 25, the resistance of resistor 23 is smaller than that of resistor 26 and the resistance of resistor 24 is equal to that of resistor 27. Under these circumstances, the total resistance of resistor 22 plus that of resistor 23 plus that of resistor 24 is less than the resistance of resistor 25 plus that of resistor 26 plus that of resistor 27. Therefore the current through the first network is greater than the current through the second network. Since the resistance of resistor 24 equals that of resistor 27, the voltage across resistor 24 will be greater than the voltage across resistor 27. Therefore since the top ends of resistors 24 and 27 are joined to the bases of transistors 20 and 21, the base of transistor 21 will be more negative than the base of transistor 20. With the circuit as shown, therefore transistor 21 will tend to conduct more than transistor 20. Therefore the current through resistor 25 will be greater than the current through resistor 22 causing the base of transistor 20 to be even less negative than the base of transistor 21. The emitters of both transistors now however are tied together through resistor 28. Since the current of both transistors therefore flows through resistor 28 and since their characteristics are essentially identical, as one transistor cuts off and the other turns on, the current through resistor 28 is essentially constant and is such as to produce a voltage drop of approximately two volts. With the potentials on the emitter held essentially constant and the potentials on the bases varying, it will be evident that transistor 20 will be rapidly cut off and transistor 21 will be rapidly switched on.

If the resistances of the resistors 23 and 24 are substantially larger than that of resistor 22, neglecting the base current of transistor 21, it will be appreciated that the potential at the junction between resistors 22 and 23 will approach the potential of conductor 19 when transistor 20 is cut off, since no collector current will be flowing through this transistor. The base of transistor 29 therefore is held negative and the transistor 29 is switched "on" permitting current to flow between the emitter and collector through diodes 31, 32, 33, and relay coil 30. The relay 30 therefore is energized and contacts 35 and 36 are closed.

Let us assume now that the supply voltage applied to terminals 2 drops, this will cause the potential across conductors 6 and 7 to drop but the potential across conductors 7 and 19 will remain substantially the same, due to the operation of Zener diode 39 and resistor 18. The change in potential at terminals 2 therefore will have no direct effect upon the bistable electronic circuit but it will have an effect upon the potential appearing at the slider of potentiometer 10. This potential is applied through contacts 35 and 36 to the base of transistor 21 causing this base to become less negative. Since the emitter of transistor 21 is held at a substantially constant voltage because the current through resistor 28 is the sum of the currents through the two transistors, the effect of the less negative potential on the base of resistor 21 will be to cause the current through transistor 21 to reduce when the potential at the slider of potentiometer 10 reaches some predetermined value. This reduction in current through transistor 21 will cause an increase in potential at the base of transistor 20, because of the reduction of current through resistor 25. The base of transistor 20 will therefore become more negative and transistor 20 will start to conduct. As the current through transistor 20 increases, the voltage drop across resistor 22 increases, thus causing the potential at the base of transistor 21 to be less negative. This action is cumulative and transistor 20 becomes conductive and transistor 21 becomes non-conductive. With transistor 20 fully conductive the collector of transistor 20 assumes essentially the same potential as its emitter. Its emitter however, it will be noted, is tied to an essentially constant potential across resistor 28 and therefore the base of transistor 29 is effectively at the same potential or substantially the same potential as the emitter of transistor 20. This less negative potential starts to cut off transistor 29. The emitter of transistor 29 is at essentially the same potential as the base of transistor 29 and this base is connected to the collector of transistor 20. Since transistor 20 is conductive, the collector and emitter of transistor 20 are at essentially the same potential. Therefore the emitter of transistor 29 is at the same potential as the emitter of transistor 20. If as was previously stated, the potential across resistor 28 is approximately two volts then the emitter of transistor 29 will now be at essentially two volts.

The current through the relay will therefore drop to a low value and depending upon the design of the relay will permit the relay to open.

In order to ensure that the relay does drop out, diodes 31, 32 and 33 have been introduced. These diodes are normal silicon diodes and will have a forward voltage drop essentially constant irrespective of current. If we assume their forward voltage drop to be approximately .6 volt, then the three diodes in series will have a cumulative voltage drop of about 1.8 volts. Therefore almost the whole of the voltage appearing at the emitter of transistor 29 will be dropped through the diodes and almost no voltage will be applied to the relay coil 30. This therefore ensures that the relay drops out and contacts 35 and 37 close. The slider of potentiometer 15 is now connected to the base of transistor 21 through diode 34 and contacts 35 and 37.

Let us now assume that the source voltage once more rises. At some point determined by the setting of the slider on potentiometer 15, the base of transistor 21 will be moved to a sufficiently negative voltage to permit transistor 21 to begin conducting.

The cumulative action previously referred to will cause transistor 21 to become fully conductive and transistor 20 to become fully nonconductive. The base of transistor 29 will then become much more negative causing transistor 29 to conduct and the relay coil 30 to be energized through the transistor 29.

It will be noted that the voltage applied to the base of transistor 21 is derived from two different potentiometer networks depending upon the condition of the bistable electronic circuit. When the supply voltage on terminals 2 is normal or above a certain permitted minimum, the point at which the bistable circuit switches over depends upon the setting of the slider of potentiometer 10. When the supply voltage has dropped below this permitted minimum, the bistable circuit has reversed its condition and the control signal is now derived from the slider of potentiometer 15. In this way the drop-out and pick-up points are individually and separately or independently adjustable by means of adjusting the sliders on potentiometers 10 and 15. The diode 34 functions primarily to isolate the base of transistor 21 when in its nonconductive state from the low impedance of the potentiometer network including resistors 10 and 11. This diode, similar to diodes 31, 32 and 33 has a constant forward potential drop of approximately one-half a volt and therefore with equal potentials appearing at the sliders different potentials will appear at the base of transistor 21 depending upon whether the diode 34 is in the circuit or not.

As will be appreciated from the foregoing, the bistable circuit is not dependent upon the continuity of the signal applied to the base of transistor 21. Once the transfer function has been commenced, it will continue until the electronic circuit has reversed its condition. This eliminates the unstable condition frequently present in a relay where the precise voltage required to cause the relay to pick-up or drop-out is an indeterminate and extremely variable quantity.

The introduction of the Zener diodes in the potentiometer network increases the sensitivity of the circuit. Since the voltage drop across the Zener diode is essentially constant, the percentage variation of the potential across the remainder of the network is greater than the percentage variation of the potential occurring across conductors 6 and 7. Therefore the percentage variation of the potential of the sliders will be greater than the percentage variation of the potential applied to terminals 2. Condensers 12 and 17 eliminate most of the ripple present in the potential across the potentiometers. This is important since obviously variations in this potential will affect the bistable circuit.

While the invention has been described in relation to a specific circuit having certain suggested voltage characteristics and using transistors, it will be appreciated that many variations could be made within the scope of the invention. It would of course be possible to replace the transistors 20 and 21 with suitable electronic tubes. Similarly transistor 29 could be replaced with a suitable electronic tube. The advantage of transistors however in this circuit is in the provision of energy for their operation directly from the reference source. The substitution of electronic tubes for these components will probably require an auxiliary supply for such tubes. The polarity of course will depend upon the nature of the transistors used and their arrangement and the potentials provided and referred to are of course only exemplary. The selection of various operating voltages of the circuit will of course depend upon the components and also upon the desired range of operation of the relay.

I claim as my invention:

1. A voltage sensing circuit comprising input terminals adapted for connection to a source of voltage, first and second voltage dividing networks connected in circuit relation with said terminals for deriving first and second separate control voltages, respectively, which each vary with the voltage of said source, a bistable circuit including first and second emitter coupled transistors having an input and only first and second stable operating conditions, a relay having an operating coil and contacts actuable by the energization and deenergization of the operating coil for connecting either said first network or said second network to the input of said bistable circuit to actuate said bistable circuit between said first and second operating conditions in response to said first or second control voltages, and a switching transistor connected between said bistable circuit and the operating coil of said relay to actuate said relay in response to said first and second operating conditions to normally connect said first network to the input of said bistable circuit when the voltage of said source rises above a first predetermined value and to connect said second network to the input of said bistable circuit when the voltage of said source drops below a second predetermined value.

2. A voltage sensing circuit comprising input terminals adapted for connection to a source of voltage variable about a nominal value, a first potentiometer connected across said source to derive a first voltage, a second potentiometer connected across said source to derive a second voltage, an emitter coupled bistable transistor circuit having a control element and two stable conditions, a relay having an operating coil controlled by said bistable circuit and contact means actuable by the energization and deenergization of the operating coil to apply said first voltage to the control element of said bistable circuit when said bistable circuit is in a first condition and means to apply said second voltage to said control element when said bistable circuit is in a second condition, said potentiometers having associated therewith Zener diodes connected in series circuit relation from said source to said potentiometers.

3. A voltage sensing circuit comprising input terminals adapted for connection to a source of voltage variable about a nominal value, a first network comprising a first Zener diode, a first resistor and a first potentiometer connected in series circuit relation across said source, a second network comprising a second Zener diode, a second resistor and a second potentiometer connected in series circuit relation across said source, a bistable transistor circuit having a control element, a relay having an operating coil controlled by said bistable circuit, a pair of normally closed contacts on said relay, a pair of normally open contacts on said relay, said pairs of contacts being actuable by the energization and deenergization of the operating coil, means to couple the slider of said first potentiometer to a control element of said bistable circuit through said normally open contacts and means to couple the slider of said second potentiometer to said control element of said bistable circuit through said normally closed contacts.

4. A voltage sensing circuit comprising input terminals adapted for connection to a source of voltage variable about a nominal value, a first network comprising a first Zener diode, a first resistor and a first potentiometer having a slider connected in series circuit relation connected across said source, a second network comprising a second Zener diode, a second resistor and a second potentiometer having a slider connected in series circuit relation connected across said source, a bistable transistor circuit having a control element and only two stable operating conditions, a relay having an operating coil controlled by said bistable circuit, a pair of normally closed contacts on said relay, a pair of normally open contacts on said relay, said contacts being actuable by the energization and deenergization of the operating coil, means to couple the slider of said first potentiometer to a control element of said bistable circuit through said normally open contacts and means to couple the slider of said second potentiometer to said control element of said bistable circuit through said normally closed contacts said source of voltage being a source of rectified alternating current voltage said first and second networks including smoothing condensers effectively connected across said potentiometers, said bistable circuit being a common emitter bistable transistor circuit.

5. A transfer switch control circuit adapted to control the transfer of a load from a normal source to an auxiliary source upon failure of said normal source to maintain a certain minimum potential and retransfer of said load back to said normal source upon resumption of a certain other minimum potential by said normal source comprising means for deriving from said normal source a direct current potential representative of the potential of said normal source, a pair of voltage dividing networks including Zener diodes and potentiometers connected in series, means for deriving a first voltage representative of the potential between the slider and one end of one of said potentiometers, means for deriving a second voltage representative of the potential between the slider and one of a second of said potentiometers, an emitter coupled bistable transistor circuit including first and second transistors each having a base, a relay having an operating coil controlled by said bistable circuit, a pair of normally open contacts on said relay for coupling said first voltage to the base of one of said transistors, a pair of normally closed contacts on said relay for coupling said second voltage to the said base of said transistor, said pairs of contacts being actuable by the energization and deenergization of said operating coil by said bistable circuit.

References Cited by the Examiner
UNITED STATES PATENTS
2,959,317  11/1960  Conger _____ 317—148.5
FOREIGN PATENTS
917,640  2/1963  Great Britain.

MILTON O. HIRSHFIELD, *Primary Examiner.*

L. T. HIX, *Examiner.*